United States Patent
Li et al.

(10) Patent No.: US 10,918,011 B1
(45) Date of Patent: Feb. 16, 2021

(54) MOTOR-DRIVEN SINGLE-SEED-EJECTION SOWING DEVICE AND A SOWING METHOD

(71) Applicant: Shandong Academy of agricultural machinery science, Jinan (CN)

(72) Inventors: QingLong Li, Jinan (CN); JingXin Shen, Jinan (CN); YiTian Sun, Jinan (CN); ShengLi Liang, Jinan (CN); Bo Zhang, Jinan (CN)

(73) Assignee: SHANDONG ACADEMY OF AGRICULTURAL MACHINERY SCIENCE, Jinan (CN)

(*) Notice: Subject to any disclaimer, the term of this patent is extended or adjusted under 35 U.S.C. 154(b) by 0 days.

(21) Appl. No.: 16/962,844

(22) PCT Filed: Apr. 3, 2020

(86) PCT No.: PCT/CN2020/083089
§ 371 (c)(1),
(2) Date: Jul. 17, 2020

(87) PCT Pub. No.: WO2020/187333
PCT Pub. Date: Sep. 24, 2020

(30) Foreign Application Priority Data

Mar. 18, 2019 (CN) .......................... 2019 1 0204156

(51) Int. Cl.
*A01C 7/10* (2006.01)
*A01C 7/12* (2006.01)
*A01C 7/20* (2006.01)

(52) U.S. Cl.
CPC .............. *A01C 7/105* (2013.01); *A01C 7/125* (2013.01); *A01C 7/127* (2013.01); *A01C 7/208* (2013.01)

(58) Field of Classification Search
CPC ......... A01C 7/105; A01C 7/125; A01C 7/127; A01C 7/208; A01C 7/102; A01C 7/10;
(Continued)

(56) References Cited

U.S. PATENT DOCUMENTS

| 3,850,286 A | 11/1974 | Tobin, Jr. |
| 2013/0175133 A1 | 7/2013 | Wagers |

FOREIGN PATENT DOCUMENTS

| CN | 101743797 A | 6/2010 |
| CN | 103609234 A | 3/2014 |

(Continued)

*Primary Examiner* — Christopher J. Novosad
(74) *Attorney, Agent, or Firm* — Bayramoglu Law Offices LLC

(57) ABSTRACT

A motor-driven single-seed-ejection sowing device includes a housing, a seed metering roller, a seed brush, a seed metering mechanism and a power mechanism. The housing includes a power compartment and a seed compartment. The surface of the seed metering roller includes seed grooves having spaces for accommodating a single seed. The seed metering mechanism includes a spring, a striking tube, a piston and the piston tube. The piston and the piston tube are arranged for axial movement inside the striking tube. The power mechanism includes a control unit and a drive unit. The control unit includes the motor, the drive panel, the Hall sensor and the magnet. The magnet is set on the striking tube. The Hall sensor and the drive panel are connected to the motor, and the motor drives the seed metering roller and seed metering mechanism by the drive unit.

14 Claims, 3 Drawing Sheets

(58) Field of Classification Search
CPC .. A01C 7/08; A01C 7/00; A01C 7/123; A01C 7/12; A01C 7/20
See application file for complete search history.

(56) References Cited

FOREIGN PATENT DOCUMENTS

| | | |
|---|---|---|
| CN | 106922262 A | 7/2017 |
| CN | 109923977 A | 6/2019 |
| CN | 209897595 U | 1/2020 |

# MOTOR-DRIVEN SINGLE-SEED-EJECTION SOWING DEVICE AND A SOWING METHOD

CROSS REFERENCE TO THE RELATED APPLICATIONS

This application is the national phase entry of International Application PCT/CN2020/083089, filed on Apr. 3, 2020, which is based upon and claims priority to Chinese Patent Application No. 201910204156.4, filed on Mar. 18, 2019 the entire contents of which are incorporated herein by reference.

TECHNICAL FIELD

The present invention relates to agricultural machinery, and more particularly, to a motor-driven single-seed-ejection sowing device and method.

BACKGROUND

Precision planters are among the agricultural machinery commonly used for large-scale cultivation in China. Most precision planters in China are mechanical or clamp-type, which have drawbacks such as seeds not being properly provided in the queue and sowing omission during high-speed planting. Many sowing monitoring systems have been developed as a result to enable monitoring of the sowing process, but there is no effective way to remedy the sowing absence automatically. It requires subsequent manual sowing. To solve this problem, designers have attempted to install a secondary seed meter on the planter, which can perform supplemental sowing when the sowing absence is detected. However, these modified secondary seed meters are installed behind the primary meter and are quite large in size. Once the seed is transferred, it is fed into the seed guide tube by its own gravity, which is especially inefficient. Moreover, existing mechanical parts have design flaws making it difficult to timely deliver the seed with precision to meet the need for the supplemental sowing during high-speed planting. Therefore, it is highly desirable to provide a new motor-driven single-seed-ejection sowing device based on the planter fault monitoring system to improve planting efficiency when the machine misses sowing.

A pneumatic sowing device, which is used as a planter, is disclosed in the Chinese patent No. 201010011516.8. The pneumatic sowing device directly ejects the seed into the soil by using pressurized air, and seed coats may be broken and the seed damaged due to the humidity and hardness of the soil. Seeds naturally drop into the ejection device by gravity, which causes a sowing delay during the high-speed planting. This is because of the complex mechanics of the ejection mechanism. It is large and must execute many mechanical operations. The pneumatic sowing device without a monitoring device, for example, cannot determine the sowing situation, which is likely to cause seed sowing omission. Most cannot perform a supplemental sowing after such omission.

An intelligent compensation system of seeders for sow omission is disclosed in the Chinese patent No. 201310673557.7. The intelligent compensation system sends seeds out by pressurized air. However, the actual delivery effect is not ideal because of air leakage caused by the irregular shape of seeds. The pressurized air is supplied by air receivers on tractors and so, installation of external pipelines and conduits is complicated and costly. If the system frequently performs the supplemental sowing, then the delivery effect will degrade due to the lack of air pressure.

SUMMARY

The present invention provides a motor-driven single-seed-ejection sowing device and a sowing method to solve the aforementioned technical problems of simultaneously performing seed shooting and preparing seed after pneumatic supplemental sowing.

To achieve the above objective, the present invention is implemented by the following technical solutions.

A motor-driven single-seed-ejection sowing device, including:

a housing, wherein the housing includes a seed inlet and a seed outlet, and a power compartment and a seed compartment are set inside the housing;

a seed metering roller, wherein the seed metering roller is rotatably fixed on the housing and is located in the seed compartment, and seed grooves for accommodating a single seed are set on the surface of the seed metering roller;

a seed brush, set on the wall of the seed compartment; and a seed metering mechanism, located inside the power compartment, including a spring, a striking tube, a piston and a piston tube, wherein two ends of the spring are set, respectively, on a Hall sensor and the piston tube; the piston is connected to the piston tube; the piston and the piston tube are set inside the striking tube and can move along the axial direction of the striking tube; the striking tube is connected to the wall of the power compartment by an elastic member; and a power mechanism, set inside the power compartment, including a control unit and a drive unit, wherein the control unit includes a motor, a drive panel, the Hall sensor and a magnet; the magnet is set on the striking tube; the Hall sensor is connected to the drive panel, and installed within the scope of the effective magnetic field when the piston tube moves to a limiting position; the Hall sensor is connected to the drive panel; the drive panel drives the motor in accordance with the signal from the Hall sensor; the motor drives the seed metering roller and seed metering mechanism through the drive unit; the power compartment and the seed compartment are both connected to the seed outlet; the central axes of the striking tube and the piston tube are coaxial with the central axis of the seed outlet.

The preferred solution of the motor-driven single-seed-ejection sowing device, wherein the drive unit includes a bevel gear set, and the drive gear of the bevel gear set is connected to the output end of the motor. The output end of the driven gear is connected to the pinion I, and the pinion I is engaged with the large gear I. The output end of the large gear I is connected to the pinion II, and the pinion II is engaged with the large gear II. The large gear II is coaxially connected to the drive wheel I and drive wheel II. The drive wheel I is engaged with the rack structure at an end of the piston tube. The drive wheel II is matched with the rack structure at an end of the striking tube. The large gear II is engaged with the pinion gear III, and the pinion II is engaged with the large gear III. The large gear III is coaxially connected to the drive wheel III, and the drive wheel III is engaged with the seed metering roller.

The preferred solution of the motor-driven single-seed-ejection sowing device, wherein the striking tube is connected to the housing via a rail slide unit and a tension spring. The inside of the striking tube is hollow, and the front end of the striking tube is provided with a rubber cap.

The preferred solution of the motor-driven single-seed-ejection sowing device, wherein the end of the seed outlet near the seed metering mechanism is provided with an elastic rubber plate, and a seed hole is conical, and is provided in the middle of the elastic rubber plate.

The preferred solution of the motor-driven single-seed-ejection sowing device, wherein a cavity is set inside the piston tube and a magnet is embedded in the cavity.

The preferred solution of the motor-driven single-seed-ejection sowing device, wherein the elastic member is the tension spring.

The preferred solution of the motor-driven single-seed-ejection sowing device, wherein the seed inlet is provided with a cover matching with the seed inlet.

A method of supplemental sowing by using the motor-driven single-seed-ejection sowing device;

(6) installing the motor-driven single-seed-ejection sowing device above the seed detection sensor of the seed guide tube;

(7) after power on, detecting whether the feedback signal from the Hall sensor by using the drive panel to determine the initial motion position; if no signal is detected, the motor works and the motor drives the seed metering roller to rotate, and seeds fall into the seed grooves of the seed metering roller and revolve around the seed metering roller; the seed brush removes the excess seeds while the striking tube and the piston tube move backward; and the air is introduced in the cavities of the piston and the striking tube, and the single seed falls into the housing, waiting for sowing;

(8) disengaging the striking tube from the drive unit when the motor continues to work after sowing absence happens, wherein the striking tube is urged away from the drive unit by the tension spring, and the air introduced in the striking tube increases; when the rubber cap at the front end of the striking tube contacts the seed, the seed is pushed in part into the seed hole of the elastic rubber plate, and the seed is completely wrapped by the seed hole by spring force to form the shape of holes that fits closely with the seed, and a closed cavity is formed by the housing, the elastic rubber plate, the seed, the piston and the striking tube;

(9) disengaging the piston tube from the drive unit as the motor rotates, wherein the piston tube is released from the elastic member and is urged forward by the spring to expel the air in the cavity, so as to eject the seed;

(10) repeatedly performing the previous steps without ceasing the motor.

The advantages of the present invention: the seed metering roller and the brush are collaboratively used to complete the extraction of the seed, the seed metering mechanism is used to complete the seed shooting, and can simultaneously operate seed shooting and preparing the seed after pneumatic supplemental sowing.

BRIEF DESCRIPTION OF THE DRAWINGS

The drawings facilitate a further understanding of the present invention and form part of the description, describing the present invention in conjunction with the embodiments, and shall not be a limitation on this invention.

Figure 1:
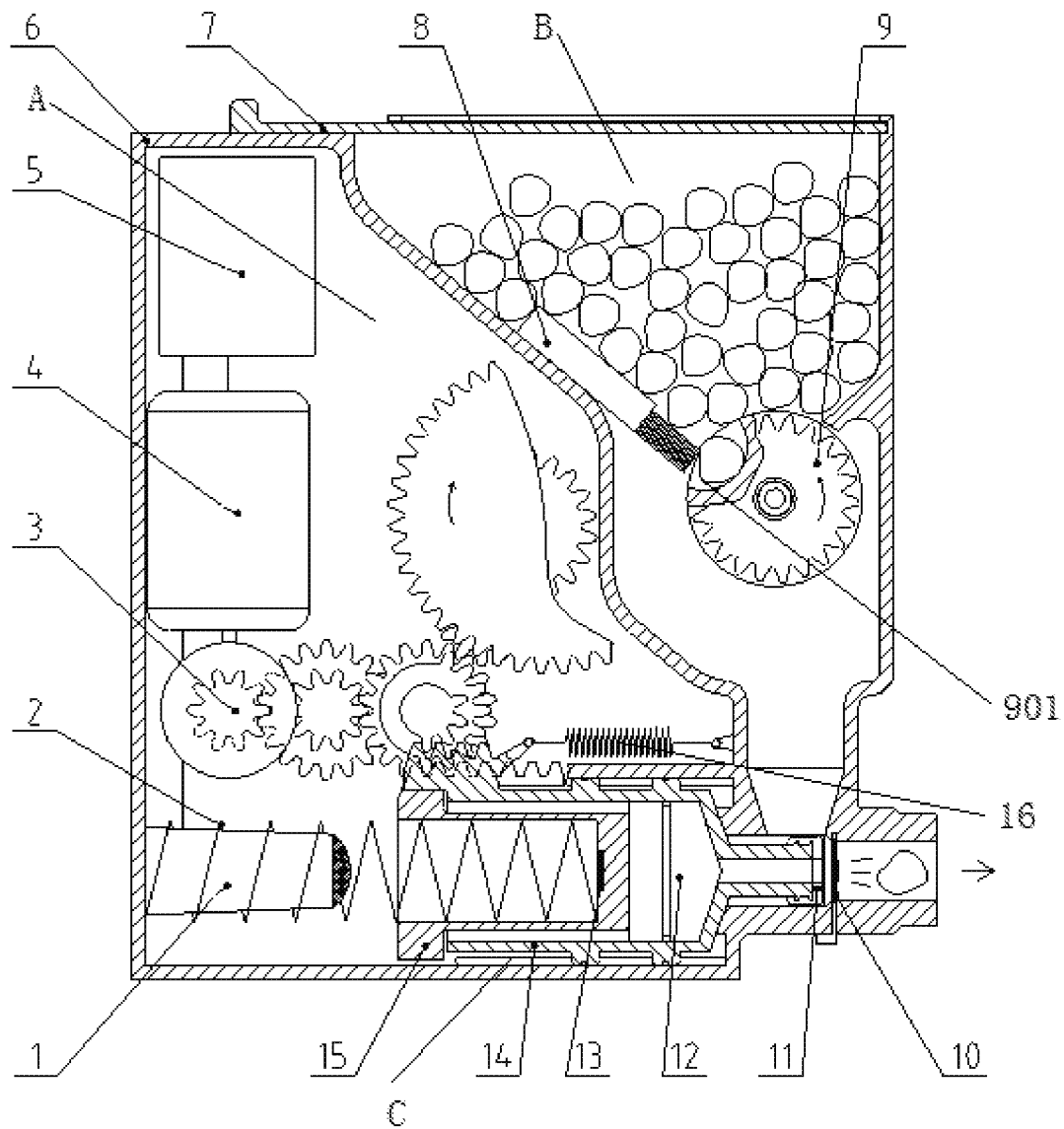
FIG. 1 is a schematic diagram showing the structure of the motor-driven single-seed-ejection sowing device.
Figure 2:
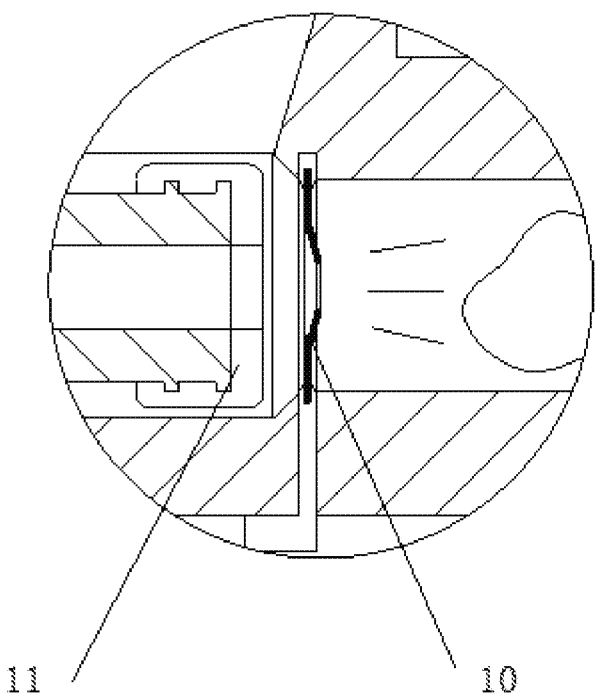
FIG. 2 is a partial enlarged schematic diagram showing the elastic rubber plate and the rubber cap
Figure 3:
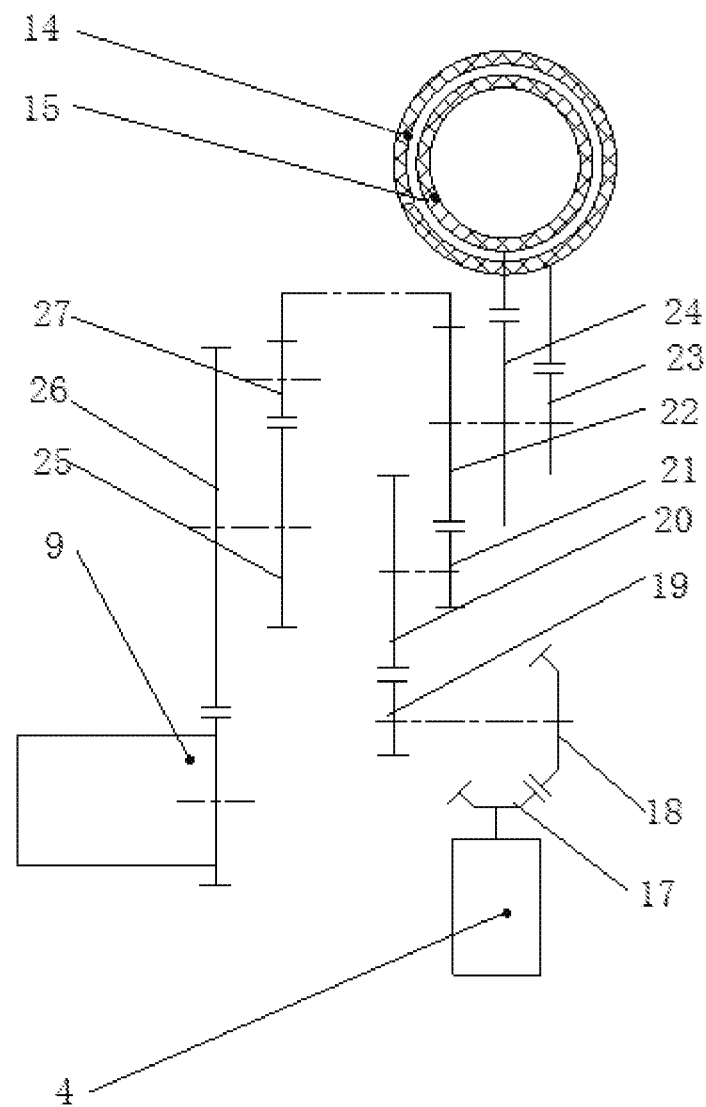
FIG. 3 is a schematic diagram showing the drive unit On the drawing.

1—Hall sensor, 2—spring, 3—gear set, 4—motor, 5—drive panel, 6—housing, 7—cover, 8—seed brush, 9—seed metering roller, 10—elastic rubber plate, 11—rubber cap, 12—piston, 13—magnet, 14—striking tube, 15—piston tube, 16—tension spring, 17—drive gear, 18—driven gear, 19—pinion I, 20—large gear I, 21—pinion II, 22—large gear II, 23—drive wheel II, 24—drive wheel I, 25—large gear III, 26—drive wheel III, 27—pinion III.

DETAILED DESCRIPTION OF THE EMBODIMENTS

The following description of the preferred embodiments of the present invention are to be taken in conjunction with the drawings. It should be noted that the preferred embodiments described are only for the purpose of illustration and interpretation of the invention only and shall not be construed as limiting the present invention.

A motor-driven single-seed-ejection sowing device, including the housing 6, the seed metering roller 9, the seed brush 8, the seed metering mechanism and the power mechanism.

The housing 6 includes the seed inlet and the seed outlet, the power compartment A and the seed compartment B are set inside housing. The seed inlet is provided with the cover 7 matching with the seed inlet.

The seed metering roller 9 is rotatably fixed on the housing 6 and is located in the seed compartment B. The seed grooves 901 having the spaces for accommodating a single seed are set on the surface of the seed metering roller.

The seed brush 8 is set on the wall of the seed compartment.

The seed metering mechanism, located inside the power compartment A, includes the spring 2, the striking tube 14, the piston 12 and the piston tube 15. One end of spring 2 is set on the Hall sensor 1, and the other end is set in the cavity of the piston tube 15. The magnet 13 is embedded in the inner side of the cavity, and the piston 12 is set on the outside of the front end of the piston tube 15. The piston 12 and the piston tube 15 are set inside the striking tube 14 and can move on the axial direction of the striking tube 14. The striking tube 14 is connected to the wall of the power compartment by an elastic member such as the tension spring 16.

The power mechanism is set in the power compartment, including the control unit and the drive unit. The control unit includes the motor 4, the drive panel 5, the Hall sensor 1. The Hall sensor 1 is connected to the drive panel 5, and the drive panel drives the motor 4 in accordance with the signal from the Hall sensor 1. The motor 4 drives the seed metering roller 9 and the seed metering mechanism through the drive unit. The power compartment A and the seed compartment B are both connected to the seed outlet. The central axes of the striking tube 14 and the piston tube 15 are coaxial with the central axis of the seed outlet.

The drive unit includes the bevel gear set, and the drive gear 17 of the bevel gear set is connected to the output end of the motor 4. The output end of the driven gear 18 is connected to the pinion I 19, and the pinion I 19 is engaged with the large gear I 20. The output end of the large gear I 20 is connected to the pinion II 21, and the pinion II 21 is engaged with the large gear II 22. The large gear II 22 is coaxially connected to the drive wheel I 24 and drive wheel II 23. The drive wheel I 24 is engaged with the rack structure at the end of the piston tube 15. The drive wheel II 23 is matched with the rack structure at the end of the striking tube 14. The large gear II 22 is engaged with the pinion gear III 27, and the pinion II 27 is engaged with the large gear III

25. The large gear III 25 is coaxially connected to the drive wheel III 26, and the drive wheel III 26 is engaged with the seed metering roller 9.

The striking tube 14 is connected to the housing 6 via the rail slide unit C and the tension spring. The interior of the striking tube 14 is hollow, and the front end of the striking tube 14 is provided with the rubber cap 11, which protects the seed coats and seeds from injury after a collision.

The end of the seed outlet near the seed metering mechanism is provided with the elastic rubber plate 10, and a seed hole is conical, and is provided in the middle of the elastic rubber plate 10. The elastic rubber plate 10 is configured for preventing air leakage and improving seed ejection.

A method of supplemental sowing by using a motor-driven single-seed-ejection sowing device described above, including the following steps:

(2) The motor-driven single-seed-ejection sowing device is installed above the seed detection sensor of the seed guide tube;

(3) After power on, the feedback signal from the Hall sensor is detected by the drive panel 5 to determine the initial motion position. If no signal is detected, the motor 4 works and the motor 4 drives the seed metering roller 9 to rotate, and seeds fall into the seed grooves of the seed metering roller 901 and revolve around the seed metering roller 901. The seed brush 8 removes the excess seeds while the striking tube 14 and the piston tube 15 move backward. Pressurized air is introduced in the cavities of the piston 12 and the striking tube 14, and the single seed falls into the housing to wait for operation;

(3) The striking tube 14 is disengaged from the drive unit, when the control motor continues to work after sowing absence happens. The striking tube 14, after disengaging, moves away from the drive unit by urging of the tension spring 16, and the air introduced in the striking tube 14 further increases. When the rubber cap 11 at the front end of the striking tube 14 contacts the seed, the seed is pushed in part into the seed hole of the elastic rubber plate 10, the seed is completely wrapped by the seed hole by spring force to form the shape of the seed hole that fits closely with the seed. A closed cavity is formed by the housing 6, the elastic rubber plate 10, the seed, the piston 12, the rubber cap 11 and the striking tube 14;

(4) As the motor 4 rotates, the rack of the piston tube 15 is disengaged with the last tooth of drive wheel I 24, and the piston tube 15 is released and urged forward by the force of the spring 2, the air is expelled in the cavity to eject the seed. After that, the motor 4 continues to work to repeatedly perform the previous steps until the Hall sensor 1 detects that the magnet 13 inside the piston tube 15 stops working.

In conclusion, it should be noted that the above embodiment is only the preferred embodiment of the present invention and is not intended to limit the present invention. Although the present invention is described in detail with reference with the above embodiment, the person skilled in the art can make modifications to the technical solution described by the above embodiments or make equivalent replacement of the partial technical features. Any modifications, equivalent replacements and improvements and the likes within the spirit and principles of the present invention shall be fall into the scope of protection of the present invention.

What is claimed is:

1. A motor-driven single-seed-ejection sowing device and a sowing method, comprising:

a housing, wherein the housing comprises a seed inlet and a seed outlet, and a power compartment and a seed compartment are set inside the housing;

a seed metering roller, wherein the seed metering roller is rotatably fixed on the housing and is located in the seed compartment; and seed grooves have spaces for accommodating a single seed, and the seed grooves are set on a surface of the seed metering roller;

a seed brush, set on a wall of the seed compartment; a seed metering mechanism, wherein the seed metering mechanism is located inside the power compartment, and the seed metering mechanism comprises a spring, a striking tube, a piston and a piston tub; two ends of the spring are respectively set on a Hall sensor and the piston tube; the piston is connected to the piston tube; the piston and the piston tube are set inside the striking tube and the piston and the piston tube are movable along an axial direction of the striking tube; the striking tube is connected to a wall of the power compartment by an elastic member; and a power mechanism, wherein the power mechanism is set inside the power compartment, and the power mechanism comprises a control unit and a drive unit; the control unit comprises a motor, a drive panel, the Hall sensor and a magnet; the magnet is provided in the striking tube; the Hall sensor is connected to the drive panel, and installed within a scope of an effective magnetic field when the piston tube moves to a limiting position; the drive panel drives the motor in accordance with a signal from the Hall sensor; the motor drives the seed metering roller and the seed metering mechanism by the drive unit;

the power compartment and the seed compartment are both connected to the seed outlet; and central axes of the striking tube and the piston tube are coaxial with the central axis of the seed outlet.

2. The motor-driven single-seed-ejection sowing device according to claim 1, comprising a bevel gear set, wherein a drive gear of the bevel gear set is connected to an output end of the motor; an output end of a driven gear is connected to a first pinion, and the first pinion is engaged with a first large gear; an output end of the first large gear is connected to a second pinion, and the second pinion is engaged with a second large gear; the second large gear is coaxially connected to a first drive wheel and a second drive wheel; the first drive wheel is matched with a first rack structure at an end of the piston tube; the second drive wheel is matched with a second rack structure at an end of the striking tube; the second large gear is engaged with a third pinion, and the third pinion is engaged with a third large gear; the large gear is coaxially connected to a third drive wheel, and the third drive wheel is engaged with the seed metering roller.

3. The motor-driven single-seed-ejection sowing device according to claim 2, wherein the striking tube is connected to the housing via a rail slide unit and a tension spring; an interior of the striking tube is hollow, and a front end of the striking tube is provided with a rubber cap.

4. The motor-driven single-seed-ejection sowing device according to claim 3, wherein an end of the seed outlet is provided with an elastic rubber plate, and the end of the seed outlet is closed to the seed metering mechanism; and a seed hole is conical, and the seed hole is provided in a middle of the elastic rubber plate.

5. The motor-driven single-seed-ejection sowing device according to claim 3, wherein the elastic member is a tension spring.

6. The motor-driven single-seed-ejection sowing device according to claim 3, wherein the seed inlet is provided with a cover, and the cover is matched with the seed inlet.

7. The motor-driven single-seed-ejection sowing device according to claim 2, wherein an end of the seed outlet is provided with an elastic rubber plate, and the end of the seed outlet is closed to the seed metering mechanism; and a seed hole is conical, and the seed hole is provided in a middle of the elastic rubber plate.

8. The motor-driven single-seed-ejection sowing device according to claim 2, wherein the elastic member is a tension spring.

9. The motor-driven single-seed-ejection sowing device according to claim 2, wherein the seed inlet is provided with a cover, and the cover is matched with the seed inlet.

10. The motor-driven single-seed-ejection sowing device according to claim 1, wherein an end of the seed outlet is provided with an elastic rubber plate, and the end of the seed outlet is closed to the seed metering mechanism; and a seed hole is conical, and the seed hole is provided in a middle of the elastic rubber plate.

11. The motor-driven single-seed-ejection sowing device according to claim 10, wherein the piston tube is provided with a cavity and the magnet is embedded inside the cavity.

12. A method of supplemental sowing using the motor-driven single-seed-ejection sowing device according to claim 10, comprising:
 (1) installing the motor-driven single-seed-ejection sowing device above a seed detection sensor of a seed guide tube;
 (2) after power on, detecting a feedback signal from the Hall sensor to determine an initial motion position; if no signal is detected, the motor works and drives the seed metering roller to rotate, and seeds fall into the seed grooves of the seed metering roller and revolve around the seed metering roller; the seed brush removes excess seeds and the striking tube and the piston tube move backward; air is introduced in the cavities of the piston and the striking tube, and the single seed falls into the housing to wait for operation;
 (3) disengaging the striking tube from the drive unit when the motor continues to work after an sowing absence happens, wherein after the striking tube is disengaged, the striking tube pops out by a force of a tension spring, and more air is introduced in the striking tube; when a rubber cap at a front end of the striking tube contacts the seed, the seed is pushed in part into the seed hole of the elastic rubber plate, and the seed is completely wrapped by the seed hole by a force of the spring to form a shaped hole and the shaped hole fits closely with the single seed, and a closed cavity is formed by the housing, the elastic rubber plate, the seed, the piston and the striking tube;
 (4) as the motor rotates, disengaging the piston tube from the drive unit, wherein the piston tube is released from the elastic member and is urged forward by the force of the spring, and the air is expelled in the closed cavity to eject the seed; and
 (5) repeatedly performing the previous steps without ceasing the motor.

13. The motor-driven single-seed-ejection sowing device according to claim 1, wherein the elastic member is a tension spring.

14. The motor-driven single-seed-ejection sowing device according to claim 1, wherein the seed inlet is provided with a cover, and the cover is matched matching with the seed inlet.

\* \* \* \* \*